(12) United States Patent
Casalaina et al.

(10) Patent No.: US 8,751,402 B2
(45) Date of Patent: Jun. 10, 2014

(54) METHOD AND SYSTEM FOR INTEGRATING A PBX-EQUIPPED CLIENT AND AN ON-DEMAND DATABASE SERVICE

(75) Inventors: Marco S. Casalaina, San Francisco, CA (US); Jim Dvorkin, Redwood City, CA (US); Jason Winters, San Francisco, CA (US); Bing Yang, San Francisco, CA (US); Dararith Ourk, San Francisco, CA (US); Rupert Chen, Emeryville, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/292,031

(22) Filed: Nov. 8, 2011

(65) Prior Publication Data
US 2012/0051534 A1    Mar. 1, 2012

Related U.S. Application Data

(63) Continuation of application No. 11/849,055, filed on Aug. 31, 2007.

(60) Provisional application No. 60/827,870, filed on Oct. 2, 2006.

(51) Int. Cl.
| | | |
|---|---|---|
| G06Q 99/00 | (2006.01) | |
| H04M 1/57 | (2006.01) | |
| H04M 1/56 | (2006.01) | |
| H04M 3/51 | (2006.01) | |

(52) U.S. Cl.
CPC ............... *H04M 1/575* (2013.01); *H04M 1/56* (2013.01); *H04M 3/5183* (2013.01); *G06Q 2220/12* (2013.01)

USPC ........ 705/51; 705/345; 705/346; 379/142.06; 379/142.15

(58) Field of Classification Search
USPC ........... 705/51, 345, 346; 379/142.06, 142.15
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 60/828,192, filed Oct. 4, 2006.

(Continued)

*Primary Examiner* — James D Nigh
(74) *Attorney, Agent, or Firm* — Zilka-Kotab, PC

(57) ABSTRACT

In accordance with embodiments, there are provided mechanisms and methods for integrating a private branch exchange (PBX)-equipped client and an on-demand database service. These mechanisms and methods for integrating a PBX-equipped client and an on-demand database service can enable embodiments with additional infrastructure at the client that is better equipped to leverage the on-demand database service. The ability of embodiments to provide such client side infrastructure can enable additional enhanced services in conjunction with telephone calls, etc.

9 Claims, 7 Drawing Sheets

(56) References Cited

U.S. PATENT DOCUMENTS

| | | | |
|---|---|---|---|
| 6,092,083 A | 7/2000 | Brodersen et al. | |
| 6,118,862 A * | 9/2000 | Dorfman et al. | 379/201.03 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| 6,349,290 B1 | 2/2002 | Horowitz et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,442,567 B1 * | 8/2002 | Retallick et al. | 705/7.27 |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,239 B1 * | 4/2004 | Kung et al. | 370/352 |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 6,931,111 B1 * | 8/2005 | Coffee | 379/201.12 |
| 6,965,865 B2 * | 11/2005 | Pletz et al. | 705/346 |
| 6,993,360 B2 * | 1/2006 | Plahte et al. | 455/555 |
| 7,023,867 B1 * | 4/2006 | Park et al. | 370/419 |
| 7,062,502 B1 | 6/2006 | Kesler | |
| 7,092,509 B1 * | 8/2006 | Mears et al. | 379/266.01 |
| 7,116,773 B2 * | 10/2006 | Forman et al. | 379/207.15 |
| 7,136,475 B1 * | 11/2006 | Rogers et al. | 379/213.01 |
| 7,181,758 B1 | 2/2007 | Chan | |
| 7,209,929 B2 | 4/2007 | Dominguez, Jr. et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,706,359 B2 * | 4/2010 | Pounds et al. | 370/353 |
| 7,953,219 B2 * | 5/2011 | Freedman et al. | 379/265.06 |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,180,034 B2 * | 5/2012 | Kan et al. | 379/201.01 |
| 8,275,836 B2 | 9/2012 | Beaven et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0046086 A1 * | 4/2002 | Pletz et al. | 705/14 |
| 2002/0065885 A1 | 5/2002 | Buonanno et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0138085 A1 * | 7/2003 | Forman et al. | 379/142.01 |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0001479 A1 * | 1/2004 | Pounds et al. | 370/352 |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0028212 A1 * | 2/2004 | Lok et al. | 379/265.09 |
| 2004/0081310 A1 | 4/2004 | Lueckhoff | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0235520 A1 * | 11/2004 | Cadiz et al. | 455/557 |
| 2004/0249650 A1 * | 12/2004 | Freedman et al. | 705/1 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0100153 A1 | 5/2005 | Pines et al. | |
| 2005/0223022 A1 | 10/2005 | Weissman et al. | |
| 2005/0283478 A1 | 12/2005 | Choi et al. | |
| 2006/0056609 A1 | 3/2006 | Dickey | 379/126 |
| 2006/0133349 A1 | 6/2006 | Kan et al. | 370/352 |
| 2006/0160566 A1 * | 7/2006 | Plahte et al. | 455/554.1 |
| 2006/0188084 A1 * | 8/2006 | Rogers et al. | 379/265.01 |
| 2006/0198363 A1 * | 9/2006 | Silverman et al. | 370/352 |
| 2006/0206834 A1 | 9/2006 | Fisher et al. | |
| 2008/0249972 A1 | 10/2008 | Dillon | |
| 2008/0263473 A1 * | 10/2008 | Becker et al. | 715/781 |

(56) References Cited

U.S. PATENT DOCUMENTS

2008/0300856 A1* 12/2008 Kirk et al. ................. 704/4
2009/0063415 A1   3/2009 Chatfield et al.
2012/0051530 A1   3/2012 Casalaina et al.
2012/0177187 A1   7/2012 Casalaina et al.
2012/0179661 A1   7/2012 Casalaina et al.

OTHER PUBLICATIONS

Non-Final Office Action from U.S. Appl. No. 11/849,055, dated Jul. 20, 2010.
Final Office Action from U.S. Appl. No. 11/849,055, dated Nov. 23, 2010.
Advisory Action from U.S. Appl. No. 11/849,055, dated Feb. 17, 2011.
U.S. Appl. No. 13/292,016, filed Nov. 8, 2011.
Non-Final Office Action from U.S. Appl. No. 13/292,016, dated Jan. 27, 2012.
Final Office Action from U.S. Appl. No. 13/292,016, dated May 24, 2012.
Non-Final Office Action from U.S. Appl. No. 13/424,255, dated Jan. 18, 2013.
Non-Final Office Action from U.S. Appl. No. 13/424,263, dated Jan. 18, 2013.
Non-Final Office Action from U.S. Appl. No. 13/292,016, dated Jun. 6, 2013.
Final Office Action from U.S. Appl. No. 13/424,255, dated Jun. 7, 2013.
Final Office Action from U.S. Appl. No. 13/424,263, dated Jun. 7, 2013.
Lorenzon et al., "Marketing Knowledge Management in strategic adoption of a CRM solutions: global supports and applications in Europe," 2005, pp. 1-29.
Final Office Action from U.S. Appl. No. 13/292,016, dated Nov. 8, 2013.
Notice of Allowance from U.S. Appl. No. 13/424,255, dated Feb. 5, 2014.

* cited by examiner

METHOD AND SYSTEM FOR INTEGRATING A PBX-EQUIPPED CLIENT AND AN ON-DEMAND DATABASE SERVICE

CLAIM OF PRIORITY

This application is a continuation of U.S. application Ser. No. 11/849,055, filed Aug. 31, 2007, which claims the benefit of U.S. Provisional Patent Application 60/827,870 entitled "Method And System For Computer Telephony Integration With An On-Demand Database Service," by Casalaina et al., filed Oct. 2, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to interfacing telephony clients with a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Such database systems are sometimes integrated with various telephony systems. Specifically, systems exist where a simple browser-based telephony client interfaces a database system for a variety of purposes. An example of such a browser-based telephony client is provided by Skype®. Unfortunately, such systems are limited due to a lack of any sort of significant telephony infrastructure on the client side. There is thus a need for addressing these and/or other issues.

BRIEF SUMMARY

In accordance with embodiments, there are provided mechanisms and methods for integrating a private branch exchange (PBX)-equipped client and an on-demand database service. These mechanisms and methods for integrating a PBX-equipped client and an on-demand database service can enable embodiments with additional infrastructure at the client that is better equipped to leverage the on-demand database service. The ability of embodiments to provide such client side infrastructure can enable additional enhanced services in conjunction with telephone calls, etc.

In an embodiment and by way of example, a method for integrating a PBX-equipped client and an on-demand database service is provided. The method embodiment includes detecting, at a client with a PBX system, an event relating to a telephone call. In response to the event, the client communications with an on-demand database service.

While the present invention is described with reference to an embodiment in which techniques for integrating a PBX-equipped client and an on-demand database service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 4 shows an exemplary graphical user interface (GUI) which may be provided by populating a template with data queried in conjunction with an incoming call, in accordance with another embodiment.

FIG. 5 shows an additional GUI which may be provided by populating a template with additional data associated with a particular case, in accordance with another embodiment.

DETAILED DESCRIPTION

General Overview

Systems and methods are provided for integrating a private branch exchange (PBX)-equipped client and an on-demand database service.

Systems that rely on a simple browser-based telephony client to interface with a database system often are limited in their ability to fully utilize such database system. For example, such browser-based telephony clients are typically devoid of any switching mechanism such as a PBX, which limits the ability of such browser-based telephony clients to leverage the database system and provide a variety of enhanced features.

Thus, mechanisms and methods are disclosed herein for integrating a PBX-equipped client and an on-demand database service to provide additional infrastructure at the client that is better equipped to utilize the on-demand database service. The ability of embodiments to provide such infrastructure can enable additional enhanced services in conjunction with telephone calls, etc. Next, mechanisms and methods for integrating a PBX-equipped client and an on-demand database service will be described with reference to example embodiments.

Figure 1:
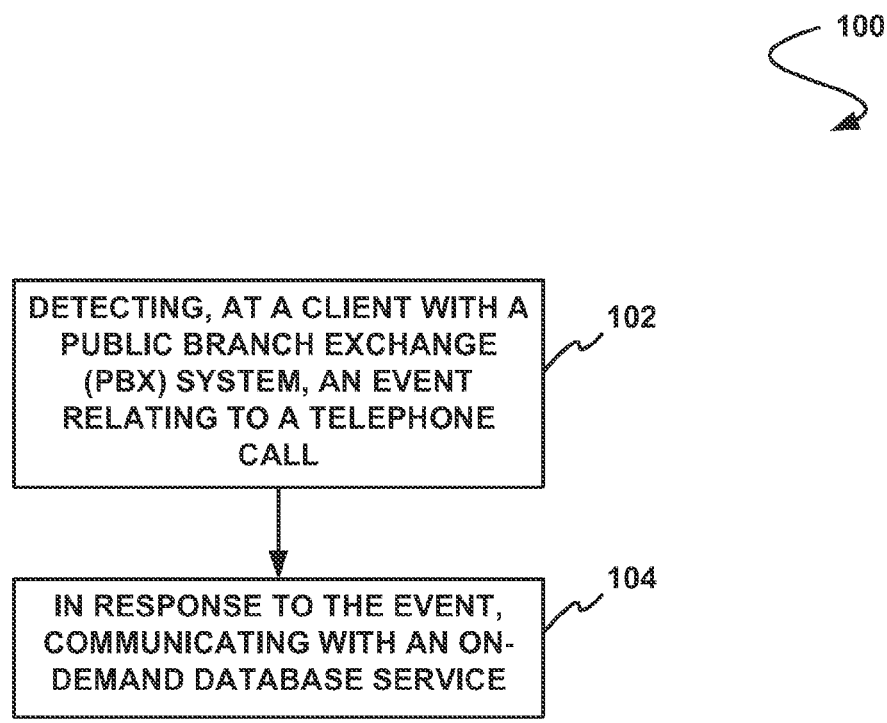
FIG. 1 illustrates a method for integrating a PBX-equipped client and an on-demand database service, in accordance with one embodiment.

FIG. 1 illustrates a method 100 for integrating a PBX-equipped client and an on-demand database service, in accordance with one embodiment. In the context of the present description, the PBX-equipped client may include any device with a PBX system. Further, in the present description, the PBX system may include at least one switch for switching calls involving a user on a local line, while allowing a plurality of users to share a certain number of external phone lines.

In one optional embodiment, the PBX system may include a telephone trunk (multiple phone lines), a computer with memory that manages the switching of the calls within the PBX system, a network of lines within the PBX system, and a console or switchboard for a human operator. Additional optional features may include, but are not limited to an agent call distributor (ACD), an interactive voice response (IVR) feature, etc.

In yet another possible embodiment, the aforementioned on-demand database service may include a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

As shown in FIG. 1, the method 100 serves to detect, at the client with the PBX system, an event relating to a telephone call. See operation 102. In one embodiment, the event may include an incoming telephone call. Of course, embodiments are contemplated where the telephone call is outgoing. Further, in various embodiments, the event may include the initiation or termination of a call. Even still, the event may include various events that occur during a call. For instance, the event may refer to any input (e.g. key-based, voice-based, etc.) from the caller, etc.

It should be noted that the event may be detected in any desired manner. For example, the event may include a signal indicative of a call status. Such signal indicative of the event may, in one embodiment, be received from a computer telephony integration (CTI) system. To accomplish this, the method 100 may, in one possible embodiment, rely on an application running on the client. Additional exemplary details associated with such an application will be described later during reference to subsequent embodiments.

In response to the event, communication is initiated with the on-demand database service. Note operation 104. The foregoing communication may involve any sending data to and/or receiving data from the on-demand database service. For example, stored data may be received that relates to a caller of an incoming call and/or such data may be sent for being stored, etc.

While the method 100 is set forth in the context of the operation of the client, it should be noted that corresponding functionality may occur at the on-demand database service. For example, an associated method may be provided for detecting, at the on-demand database service, a message associated with an event relating to a telephone call. Such message may include any communication including data. In response to the message, communication may be initiated with the PBX-equipped client.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
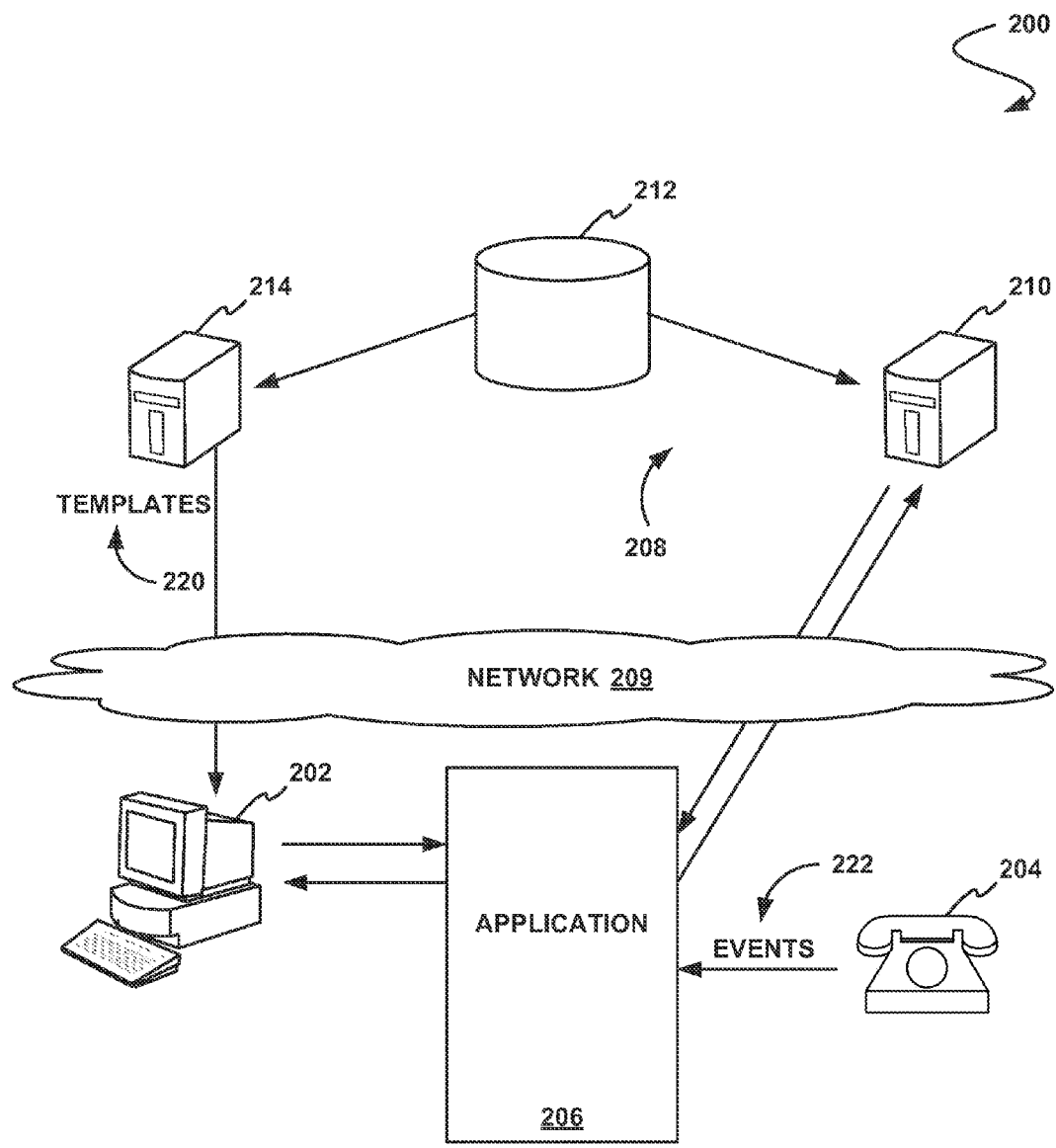
FIG. 2 shows a system for integrating a PBX-equipped client and an on-demand database service, in accordance with one embodiment.

FIG. 2 shows a system 200 for integrating a PBX-equipped client and an on-demand database service, in accordance with one embodiment. As an option, the present system 200 may be implemented to carry out the method 100 of FIG. 1, for example. Of course, however, the system 200 may be implemented in any desired environment. It should also be noted that the aforementioned definitions may apply during the present description.

As shown, a client 202 is provided that remains in communication with a CTI system 204 via an application 206. While the application 206 is shown to be separate from the client 202, it should be noted that embodiments are contemplated where the application 206 resides on the client 202. As further shown, the client 202/application 206 communicates with an on-demand database service 208 via a network 209 (e.g. Internet, wide/local area network, etc.). Additional exemplary details associated with such an application 206 will be described later during reference to subsequent embodiments.

Such on-demand database service 208, in the current embodiment, is shown to include a search server 210 and a template server 214 each in communication with at least one database 212. In operation, the template server 214 stores a plurality of templates that may be used by various clients 202, and the search server 210 may serve to allow the database 212 to be queried. While the various components of the on-demand database service 208 are shown to be separate, it should be noted that they may, in other embodiments, be integrated as desired.

In use, the client 202 may receive one or more templates 220 from the template server 214. In one embodiment, the template 220 may be received in conjunction with an initialization of the client 202 and/or application 206. As will be soon set forth, the template 220 may be populated with various data during a call.

In various embodiments, the template 220 may differ for each of a plurality of the clients 204. For example, depending on a location of the client 202, a language of the template 220 may differ. In another example, different users and/or groups (e.g. grouped by title, job description, duties, etc.) may each receive a different template 220 that is tailored for a particular application, etc.

To accomplish this, the template server 214 may, in one embodiment, translate predetermined page layouts for a given client into an XSL document (e.g. an XSLT document, etc.). This document may use uniquely-assigned identifiers of various fields, buttons, and/or other such objects in a user interface, so that they may be translated into appropriate HTML elements. Additionally, the XSLT document may contain labels for user interface components that are to be shown, localized to the current user language, etc. It should be noted that any such customization may be predetermined by an administrator, etc.

During operation, the XSLT document may contain any necessarily logic for use when translating incoming XML user interface information to HTML. For instance, if an administrator specifies that no more than three contacts may be shown in the user interface, the XSLT document may enforce such rule, even if XML containing more than three contacts (for example) is received. When necessary, the XSLT document may generate Javascript references and DHTML. By this design, an administrator may add/configure any number of entities in the user interface, insofar as the entities have a phone field to relate them to the incoming phone number.

Upon receiving an event 222 from the CTI system 204, the application 206 communicates with the search server 210 for the purpose of gathering additional information associated with the event 222. For example, in an embodiment where the event 222 reflects an incoming call, information received in association with the event (e.g. caller identifier, phone number, etc.) may be used to query the database 212 via the search server 210.

To this end, data may be received from the search server 210 at the application 206 that relates to the incoming call. Such data may include, but is not limited to contact information (e.g. name, address, etc.) associated with the caller, account information (e.g. historical data, billing information, balance due, work item status, etc.), and/or any other information associated with as aspect of the telephone call.

Armed with such data, the application 206 may make such data accessible to the client 202 for a variety of purposes. For example, the client 202 may communicate with the application 206, for the purpose of requesting data to populate the aforementioned template 220 at the client 202. As mentioned earlier, the data may, in one embodiment, take the form of XML. Further, the populated template 220 may be displayed utilizing a network browser.

In a similar manner, any data received from the caller and/or the client operator may be communicated to the search server 210 for the purpose of storing the data in the database 212. To this end, the database 212 of the on-demand database service 208 may be read and written, in conjunction with a phone call. Various embodiments are contemplated for enabling the foregoing communication between the client 202 and the application 206.

In one embodiment, the application may include a server. For example, the server may include a hypertext transfer protocol (HTTP) server. Such HTTP server provided by the application 206 may reside on the client or a separate device, as desired. In one embodiment, the HTTP server may entertain HTTP requests only from the client 202 and may also serve responses only to the client 202 as well. In use, the HTTP server may hold a buffer that is filled by the application 206 such that, when the aforementioned browser polls the HTTP server, the contents of the buffer may be sent. The buffer may be filled via any desired method (e.g. utilizing a callback function intended for the application 206, a specially formatted POST operation, etc.).

In another embodiment, the application may include a component object model (COM) interface. In use, the COM interface may be used to overcome any deficiencies of the network browser that would otherwise inhibit its use in the present system 200. To accomplish this, the application 206, rather than listening for connections from the network browser, may instead control the network browser directly using a COM interface.

For example, in one embodiment, the application 206 may subscribe to an events interface called ShDocVw. ShDocVw may keep information about all applications running in the operating system (e.g. MICROSOFT WINDOWS, etc.). When a new application is started, it may issue an event notifying all interested patties. The application 206 may use this event to determine whether a new instance of the network browser has been started. Once the application 206 has determined that there is a running browser instance, it may subscribe to a predetermined interface (e.g. DWebBrowserEvents2 interface, etc.) which may publish a particular event (e.g. BeforeNavigate, etc.).

In operation, the application 206 may receive these events, at which time it may have an opportunity to change the user interface. The application 206 may search for any URLs containing a particular domain (e.g. "salesforce.com," etc.) and when it finds one, it may search the page for a DIV element which may be present. If it finds such DIV element, it may fill the DIV element with the HTML. Additionally, the application 206 may subscribe to another event that may allow it to intercept certain script calls. One specific script call it may intercept is "sendCTIMessage," which may be a mechanism by which messages are sent from the browser to the application 206 in both of the aforementioned HTTP and COM embodiments. By intercepting this script function, the COM embodiment may be able to determine the message that the user is attempting to send during use.

By virtue of the foregoing design and enabled communication between the application 206 and the on-demand database service 208, a variety of features may be provided. Examples of such features may include, but are certainly not limited to a screen population feature, a click-to-dial feature, and a comment feature. In one embodiment, the screen population feature may involve any page relevant to an incoming call, either in a current browser window or in a new window. More information regarding an exemplary screen population feature will be set forth in the context of different embodiments illustrated in FIGS. 4-5.

In another embodiment involving the comment feature, a facility may be available to add comments to a call. Such comments may be attached to the call as they are typed, and may further be transferred or conferenced with the call. Additionally, such comments may be logged along with any other activity logged for the call.

In yet another embodiment involving the click-to-dial feature, such feature may allow phone number fields to be clickable links. When the link is clicked, a dial message may be sent to the application 206, along with a normalized version of the phone number that may have been clicked. As an option, a particular class (e.g. PhoneNumberElement, etc.) may be provided that can be used to render phone numbers so that they are displayed as a link when the CTI system 204 is enabled for a current user.

In one embodiment, the link may be a script which may generate an asynchronous call to the application 206 on a port specified in the environment. In different embodiments, certain calling codes may be utilized. For instance, a "9" may be prepended to dial out, as well as a domestic or international calling code (e.g. 1, 011, 001, etc. depending on the country of origin). The specific values of any such codes may be stored in a dialing options section of each environment, and may be automatically prepended as needed.

In the event that the CTI system 204 is not available (e.g. when an agent logs in from a remote location), phone numbers may still appear as links. Clicking on them, however, may produce an error message which may state that the CTI system 204 is not available. The error message may appear as an alert window, and may request that the user ensure that the CTI system 204 is installed and running. If the CTI system 204 is not found at first (or if a connection is refused), the instant feature may port scan up to two ports beyond a specified port in order to try to find the CTI system 204.

Figure 3:
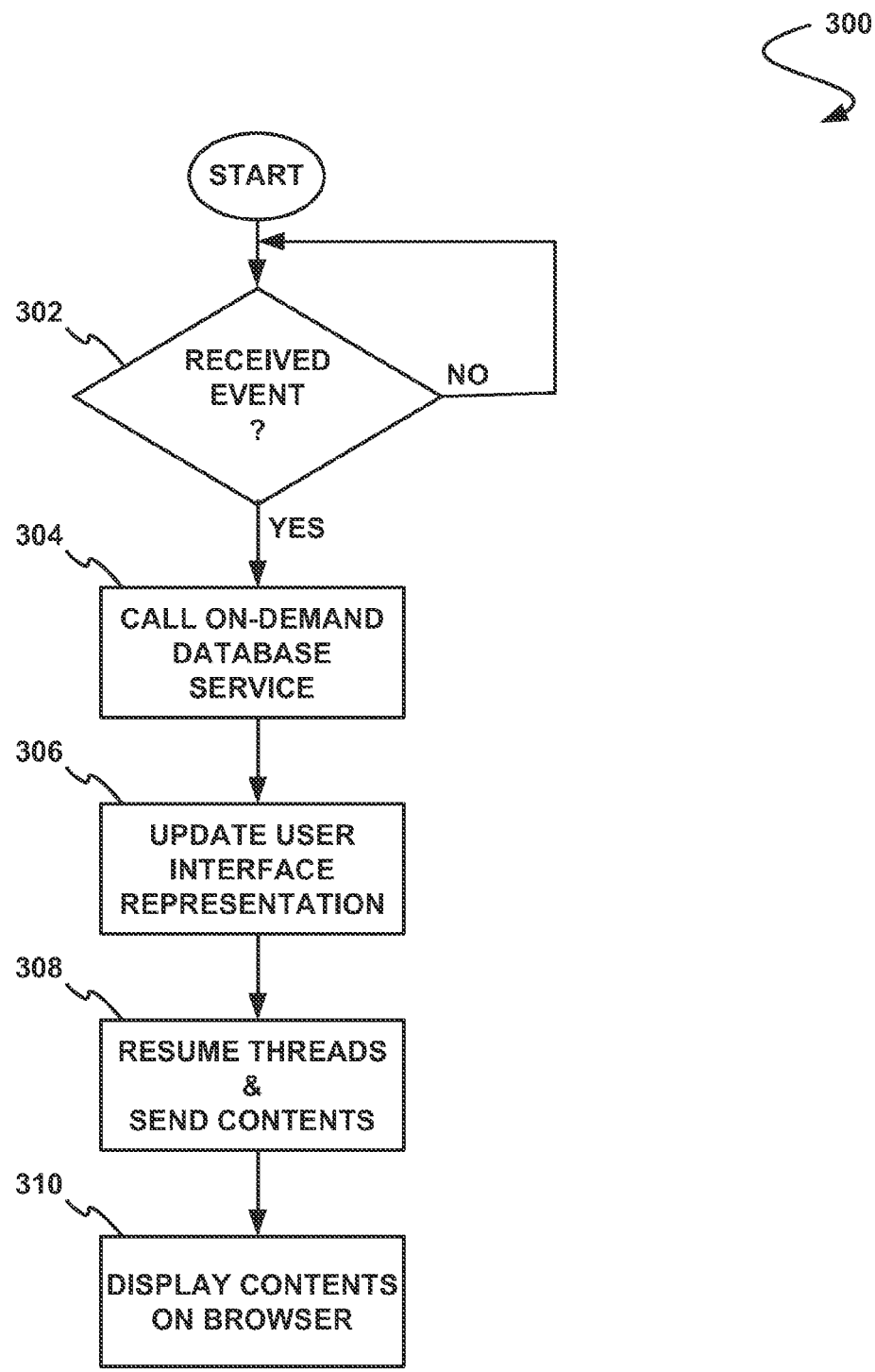
FIG. 3 shows a method for populating a template with data queried in conjunction with an incoming call, in accordance with another embodiment.

FIG. 3 shows a method 300 for populating a template with data queried in conjunction with an incoming call in accordance with another embodiment. As an option, the present method 300 may be carried out in the context of the architecture and/or functionality of FIGS. 1-2. For example, the method 300 may represent the functionality of an application (e.g. the application 206 of FIG. 2). Of course, however, the method 300 may be carried out in any desired environment. Again, the aforementioned definitions may apply during the present description.

As shown, it is determined in decision 302 whether an event notification has been received. In one embodiment, such event notification may be received from a CTI system (e.g. the CTI system 204 of FIG. 2) at an application (e.g. the application 206). Further, such event notification may be provided in response to the receipt of an incoming call.

Upon it being determined in decision 302 that an event notification has been received, a call is made to an on-demand database service (e.g. the on-demand database service 208). See operation 304. Such call may, in one embodiment, be initiated by the aforementioned application and include a caller identifier associated with the incoming call. In response to such call, the on-demand database service may provide objects associated with any desired aspect of the incoming call. Strictly as an option, such call may be made using the Simple Object Access Protocol (SOAP) provided by Salesforce.com®. Of course, use of other protocols is contemplated.

Armed with such objects, the foregoing application may update any relevant user interface representation with the same. See operation 306. In the context of an embodiment where the application takes the form of an HTTP server, such server may be equipped with the data. Further, such server may resume any sleeping threads and send contents to an output buffer, as indicated in operation 308.

This, in turn, makes the data available to a client (e.g. the client 202). Specifically, a browser at the client may receive the data (e.g. in XML format), apply any necessary template, and update a user interface via the network browser. See operation 310.

Figure 4:
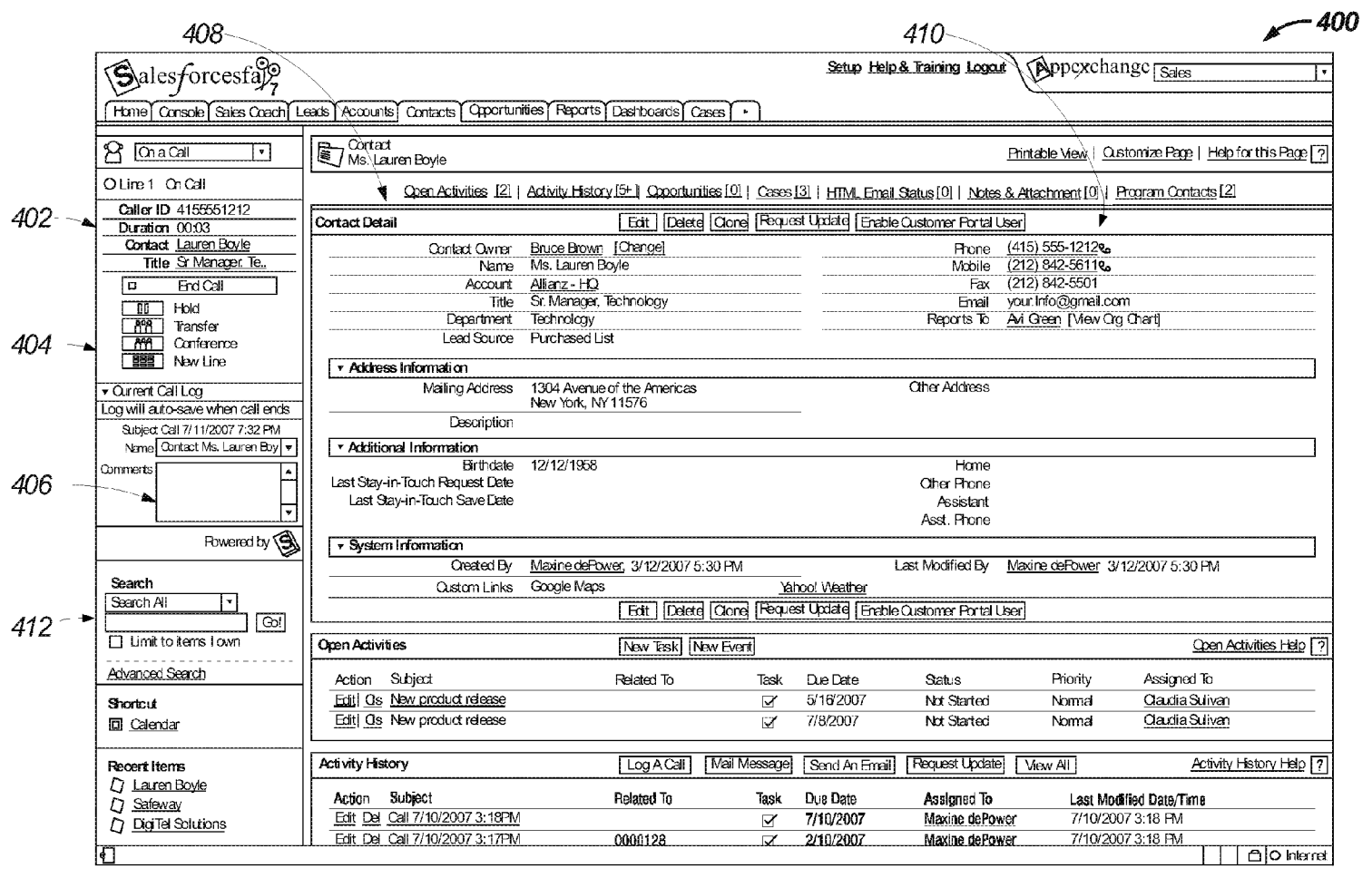

FIG. 4 shows an exemplary graphical user interface (GUI) 400 which may be provided by populating a template with data queried in conjunction with an incoming call, in accordance with another embodiment. As an option, the present GUI 400 may be provided in the context of the architecture and/or functionality of FIGS. 1-3. For example, the GUI 400 may be provided by a client (e.g. the client 202 of FIG. 2). Of course, however, the GUI 400 may be used in any desired environment. Yet again, the aforementioned definitions may apply during the present description.

As shown, the GUI 400 includes a current caller information window 402 that includes various data that may be retrieved from an on-demand database service in response to an incoming call. Such data is shown to include, but is not limited to a name, caller identifier, dialed number, account identifier, customer type, a queue, etc. Further provided is a caller action window 404 including various actions that a user of the client may employ by clicking the same. As shown, such actions may include, but are not limited to reject, hold, transfer, conference, etc. In the case of a call transfer, any data entered by a current user may be transferred (or otherwise made accessible via the on-demand database service) to an additional user. As shown, comments may be entered in association with the call described in the current caller information window 402, utilizing a comment window 406.

As further shown, the GUI 400 may still further include additional data associated with a particular case in a case detail window 408. Again, such additional data may be received from the on-demand database service. Such case detail window 408 may include various information associated with an open case that relates to the caller (e.g. an account associated with the caller, etc.). As illustrated, such data may include case information in the form of a case owner, a case number, a contact name, an account name, a status, a priority, a type, a case origin identifier, a date/time, etc. Still yet, the case detail window 408 may also include other information such as provisioning information, description information, system information, etc. Also included may be one or more phone numbers 410 that may allow for the above-described click-to-dial feature. Still yet, a search function 412 may be provided for allowing a directory of contacts, cases, and/or any other information to be searched.

Figure 5:
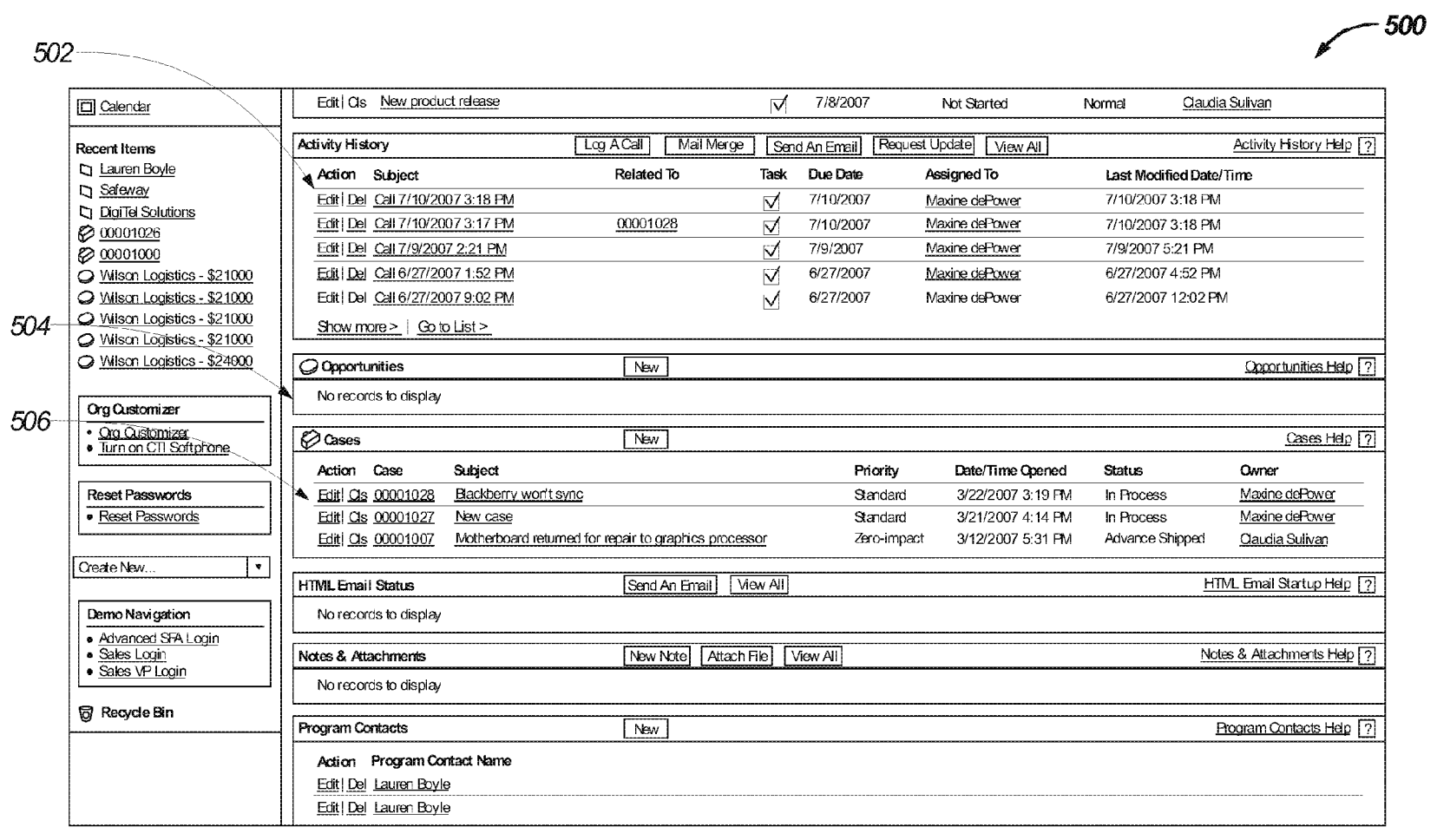

FIG. 5 shows an additional reporting GUI 500 which may be provided by populating a template with additional data associated with a particular case, in accordance with another embodiment. As shown, the reporting GUI 500 may include additional information including, but not limited to an activity history 502 illustrating a history of calls received and/or made by a particular user, opportunities 504 illustrating various opportunities for a particular user to initiate contact with potential customers, cases 506 illustrating various pending tasks, issues, etc. associated with different customers, etc. As an option, such reporting GUI 500 may be accessed via the GUI 400 of FIG. 4.

System Overview

Figure 6:
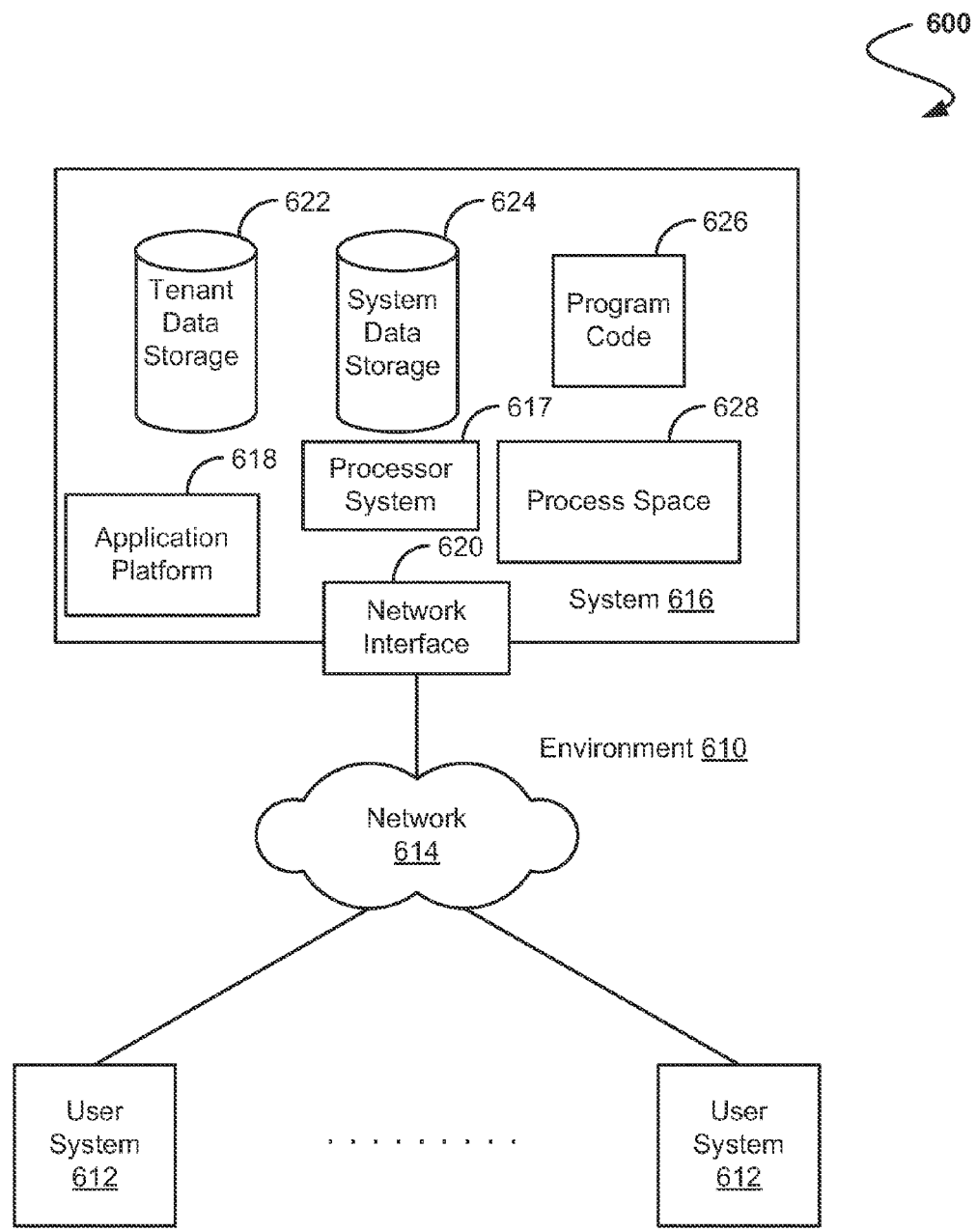
FIG. 6 illustrates a block diagram of an example of an environment wherein an on-demand database service might be used.

FIG. 6 illustrates a block diagram of an environment 610 wherein an on-demand database service might be used. As an option, any of the previously described embodiments of the foregoing figures may or may not be implemented in the context of the environment 610.

Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 7:
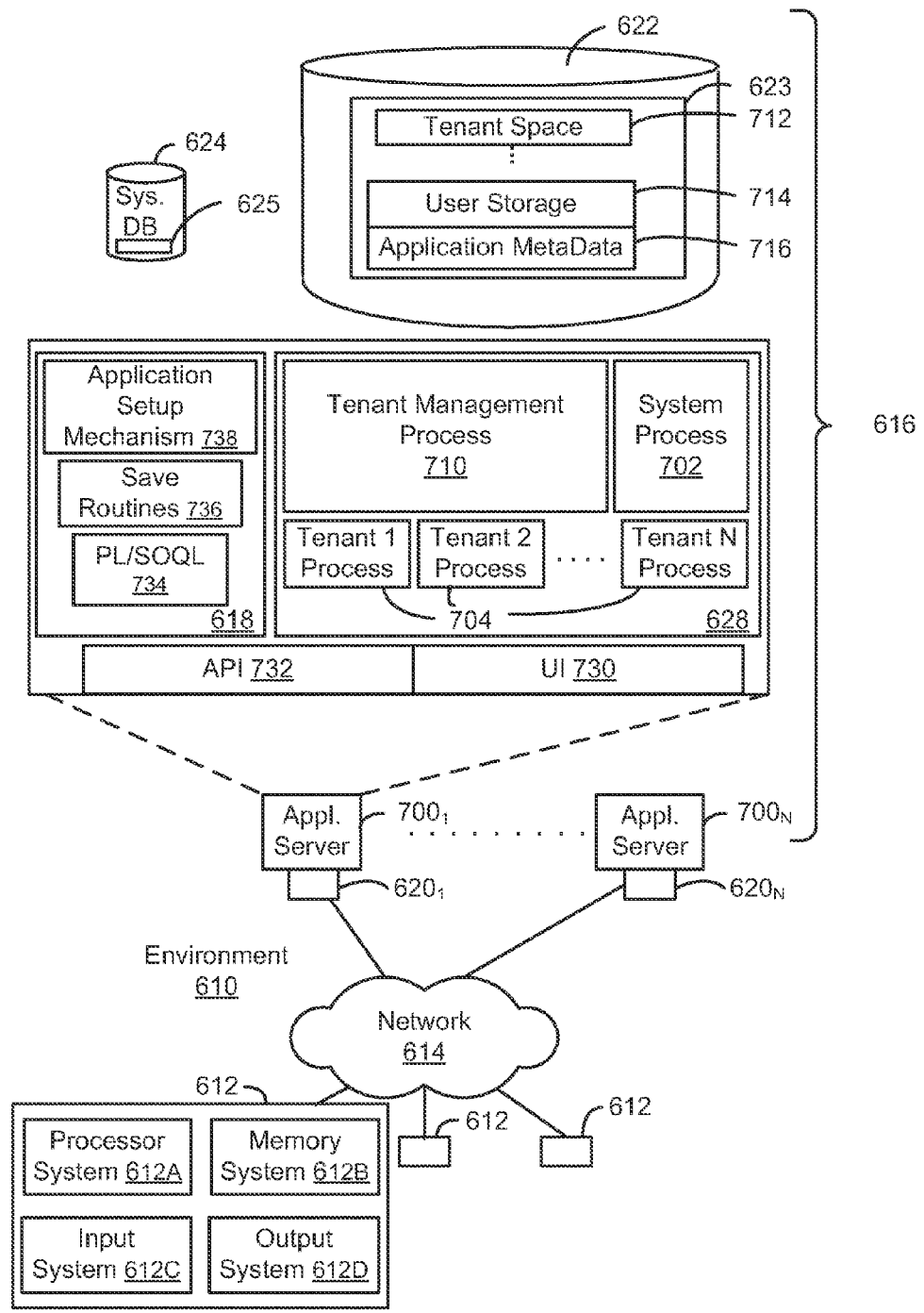
FIG. 7 illustrates a block diagram of an embodiment of elements of FIG. 6 and various possible interconnections between these elements.

One arrangement for elements of system 616 is shown in FIG. 7, including one or more network interfaces $6201$-$620_N$, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where inure than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN. LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616, FIG. 7 also shows that system 616 may include tenant data storage 622, tenant data 623, system data storage 624, system data 625, User interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700$_1$ might be coupled via the network 614 (e.g., the Internet), another application server 700$_{N-1}$ might be coupled via a direct network link, and another application server 700$_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data front the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer program product, comprising a non-transitory computer usable medium having a computer readable program code embodied therein, the computer readable program code adapted to be executed by a processor to implement a method, the method comprising:

providing a user interface to a first party, the user interface retrieved from an on-demand database service and customized for the first party, where the user interface is a template capable of being configured differently for different groups of users including configuring a language of the template based at least on a location associated with the users by including in the template labels for user interface components that are to be shown and localized to the language;

receiving, from a device with a private branch exchange (PBX) system at the on-demand database service, information received in association with an event relating to a call incoming to a computer telephony integration system of the first party, the event detected in connection with the device with the PBX system; and sending by the on-demand database service a response to the receipt of the information, the response comprising additional information associated with the event including at least:
identification information of a second party that initiated the call, and
an action to reject the call,
wherein the second party that initiated the call is a customer of the first party;

updating the user interface with the additional information by at least including in the user interface the identification information of the second party that initiated the call and a selectable option to employ the action to reject the call;

providing the updated user interface to the first party for which the call is incoming;

through the updated user interface, allowing receipt of entry information input during the call by the first party; and transferring the entry information to the calling party during the call, wherein the entry information is transferred to the second party via the on-demand database service.

2. The computer program product of claim 1, wherein the detecting of the event occurs at the device.

3. The computer program product of claim 1, wherein the detecting of the event occurs at the on-demand database service.

4. The computer program product of claim 1, wherein the identification information of the second party that initiated the call is a name of the second party.

5. The computer program product of claim 1, wherein the additional information with which the user interface is updated further includes an action to hold the call, an action to transfer the call, and an action to initiate a conference for the call.

6. The computer program product of claim 1, wherein the user interface is provided to the first party via a network browser of the first party.

7. A method, comprising:

providing a user interface to a first party, the user interface retrieved from an on-demand database service and customized for the first party, where the user interface is a template capable of being configured differently for different groups of users including configuring a language of the template based at least on a location associated with the users by including in the template labels for user interface components that are to be shown and localized to the language;

receiving, from a device with a private branch exchange (PBX) system at the on-demand database service, information received in association with an event relating to a call incoming to a computer telephony integration system of the first party, the event detected in connection with the device with the PBX system; and sending by a processor of the on-demand database service a response to the receipt of the information, the response comprising additional information associated with the event including at least:
identification information of a second party that initiated the call, and
an action to reject the call,
wherein the second party that initiated the call is a customer of the first party;

updating the user interface with the additional information by at least including in the user interface the identification information of the second party that initiated the call and a selectable option to employ the action to reject the call;

providing the updated user interface to the first party for which the call is incoming;

through the updated user interface, allowing receipt of entry information input during the call by the first party; and transferring the entry information to the calling party during the call, wherein the entry information is transferred to the second party via the on-demand database service.

8. An apparatus, comprising:

a processor for executing computer readable program code embodied on a non-transitory computer usable medium to perform a method, the comprising:

providing a user interface to a first party, the user interface retrieved from an on-demand database service and customized for the first party, where the user interface is a template capable of being configured differently for different groups of users including configuring a language of the template based at least on a location associated with the users by including in the template labels for user interface components that are to be shown and localized to the language;

receiving, from a device with a private branch exchange (PBX) system at the on-demand database service, information received in association with an event relating to a call incoming to a computer telephony integration system of the first party, the event-detected in connection with the device with the PBX system; and sending by the on-demand database service a response to the receipt of the information, the response comprising additional information associated with the event including at least:
identification information of a second party that initiated the call, and
an action to reject the call,
wherein the second party that initiated the call is a customer of the first party;

updating the user interface with the additional information by at least including in the user interface the identification information of the second party that initiated the call and a selectable option to employ the action to reject the call;

providing the updated user interface to the first party for which the call is incoming;

through the updated user interface, allowing receipt of entry information input during the call by the first party; and transferring the entry information to the calling party during the call, wherein the entry information is transferred to the second party via the on-demand database service.

9. The apparatus of claim 8, wherein the detecting of the event occurs at the device.

\* \* \* \* \*